United States Patent [19]

Miyamoto et al.

[11] Patent Number: 4,943,933
[45] Date of Patent: Jul. 24, 1990

[54] METHOD FOR TRANSLATING DATA BASE TO KNOWLEDGE AND APPARATUS THEREFOR

[75] Inventors: Hironori Miyamoto, Yokohama; Hidefumi Kondo, Yamato; Hirohide Haga; Rinichi Takashi, both of Yokohama, all of Japan

[73] Assignee: Hitachi, Ltd., Tokyo, Japan

[21] Appl. No.: 272,727

[22] Filed: Nov. 17, 1988

[30] Foreign Application Priority Data

Nov. 20, 1987 [JP] Japan .................................. 62-292176

[51] Int. Cl.$^5$ ............................................. G06F 15/18
[52] U.S. Cl. .................................................... 364/513
[58] Field of Search ............................... 364/513, 300

[56] References Cited

U.S. PATENT DOCUMENTS 4,809,219 2/1989 Ashford et al. ...................... 364/300

OTHER PUBLICATIONS

"Information Processing", vol. 27, No. 1, by Information Processing Society of Japan (on an advertisement page of software "Excore"). English translation not provided by applicants.

Primary Examiner—Allen MacDonald
Attorney, Agent, or Firm—Fay, Sharpe, Beall, Fagan, Minnich & McKee

[57] ABSTRACT

In knowledge translation of data base in an expert system which draws inference based on knowledge, a table for defining a correspondence relationship between the knowledge and the data base, data base/knowledge translator for reading data necessary for the inference directly from the data base by using the correspondence relation table and translating it to knowledge form, and knowledge/data base translator for translating the knowledge prepared by the inference to data base form by using the correspondence relation table and storing it are provided.

5 Claims, 5 Drawing Sheets

FIG. 2

```
201
    class      country;
202
    is-TBL('COUNTRY', 'NAME');
203
    instance-part{
    204                    205
        slots     CAPITAL  (is FLD('CAPITAL');
    204                    206
        slots     LANGUAGE (is alter FLD('LANGUAGES',
                           'COUNTRY', LANGUAGE');

};
207
    end.
```

FIG. 3

COUNTRY

301

| NAME | CAPITAL |
|---|---|
| US | WASHINGTON DC |
| JAPAN | TOKYO |
| SWITZERLAND | BERN |

LANGUAGES

302

| COUNTRY | LANGUAGE |
|---|---|
| US | ENGLISH |
| JAPAN | JAPANESE |
| SWITZERLAND | FRENCH |
| SWITZERLAND | GERMANY |

FIG. 5

WORKING MEMORY 101 class_A —501a   501 methods{
process1:–send(US, read_value(CAPITAL, X)), — 501c
send(JAPAN, write_value(CAPITAL, Tokyo)), — 501d
send(SWITZERLAND, add_value(LANGUAGE, ENGLISH)), —
send(SWITZERLAND, delete_value(LANGUAGE, FRENCH)), —
send(JAPAN, kill), — 501f                    501e
send(country, create(CHINA)). —
                                    501g country —502a   502
instance_part{
slots CAPITAL ; —502b
slots LANGUAGE ;
}                                  502c

US — 503a   503
slots CAPITAL
WASHING-
TON DC ;
slots LANGUAGE
{ENGLISH} ;

JAPAN — 504a   504
slots CAPITAL
TOKYO ;
slots LANGUAGE
{JAPANESE} ;

SWITZERLAND — 505a
slots CAPITAL — 505b
BERN ;
slots LANGUAGE —
{FRENCH,  505c
GERMAN} ;    505

— CONVENTIONAL 506   (FIG.2) CLASS OBJECT country. —506a
is_TBL('COUNTRY','NAME'); —506b
instance_part{
slots CAPITAL (is_FLD('CAPITAL'); —506c
slots LANGUAGE (is_alter_FLD(
'LANGUAGES','COUNTRY','LANGUAGE')); —506d
}

THIS INVENTION

507   COUNTRY         508   LANGUAGES

| NAME | CAPITAL |
|---|---|
| US | WASHINGTON DC |
| JAPAN | TOKYO |
| SWITZERLAND | BERN |
| CHINA | |

| COUNTRY | LANGUAGE |
|---|---|
| US | ENGLISH |
| JAPAN | JAPANESE |
| SWITZERLAND | FRENCH |
| SWITZERLAND | GERMAN |

DATABASE

103

METHOD FOR TRANSLATING DATA BASE TO KNOWLEDGE AND APPARATUS THEREFOR

BACKGROUND OF THE INVENTION

The present invention relates to knowledge translation of data base data in an expert system which make inferences based on knowledge, and more particularly to a processing method and apparatus for handling definitions of relationships between knowledge and data in a data base being used as knowledge of the expert system.

DESCRIPTION OF PRIOR ART

An expert system which draws association and inference based on a huge volume of knowledge to substitute an intellectual activity of human beings by a computer has been known, as shown in INFORMATION PROCESSING, Vol. 27, No. 1 by Information Processing Society of Japan (on an advertisement page of software "EXCORE"). In the prior art, data in a data base is translated to knowledge before inference is initiated, and it is stored in a knowledge base of an expert system, and inference is drawn based on the stored knowledge base. After the inference has been completed, the knowledge in the knowledge base is translated to data base and it is stored in the data base.

In the prior art, prior to the inference, the data in the data base is translated to knowledge and then inference is drawn based on data in the knowledge base. Accordingly, in the prior art is has been necessary to convert the entire data of the data base to the knowledge and copy it as a result, consumption of a storage area in the computer in which the knowledge base is stored is large.

SUMMARY OF THE INVENTION

It is an object of the present invention to provide a knowledge translation method and apparatus of a data base which can utilize data in the data base directly as knowledge to reduce consumption of a storage area of the knowledge base.

In order to achieve the above object, in a correspondence relation table which defines a correspondence relationship between knowledge and the data base is prepared. Whenever knowledge corresponding to the data base is referred to by using the correspondence relation table, data corresponding to the knowledge to be referred to is read from the data base and translated to knowledge. Knowledge produced as a result of inference is translated into data in the form of the data base by referring to the correspondence relation table and is stored into the data base. A translation program means for translation between knowledge and the data base, including the correspondence relation table, is provided.

The correspondence relation table defines the correspondence between the knowledge utilized in the expert system and the data of the data base, and can decide which data of the data base is required for use as knowledge in the expert system.

If retrieval, updating, addition or deletion of the knowledge is effected in the course of inference, the retrieval, updating, addition and deletion of the data of the data base, determined by the correspondence relation table, is automatically effected.

In this manner, the data in the data base can be directly utilized as knowledge in the expert system. Accordingly, it is not necessary to translate the entire data of the data base to knowledge and copy it as was done in the prior art. Rather, only the data necessary is fetched for the inference when an instruction is executed and only this data is translated to knowledge. As a result, the wide area to store the knowledge which has been required in the prior art is no longer necessary.

BRIEF DESCRIPTION OF THE DRAWINGS

FIG. 1 shows a schematic configuration of one embodiment of the present invention.

DESCRIPTION OF THE PREFERRED EMBODIMENTS

Referring to FIGS. 1 to 4, the embodiment of the present invention is explained.

FIG. 1 shows an example of a structuring tool for an expert system which utilizes the present invention. Numeral 101 denotes a working memory which stores knowledge so that the expert system can rapidly draw inference. It is on a main storage. Numeral 102 denote; an inferences engine which makes inference based on knowledge and which is on the main storage. Numeral 103 denotes a data base which stores a large amount of data and which is on a secondary storage. Numeral 104 denotes a data base translation mechanism which translates data in the data base to knowledge. In the present embodiment, the data in the table of the relational data base is utilized as values to represent name and content of the knowledge. The operation of inference of the present embodiment will be briefly described with reference to FIG. 5.

Figure 5:
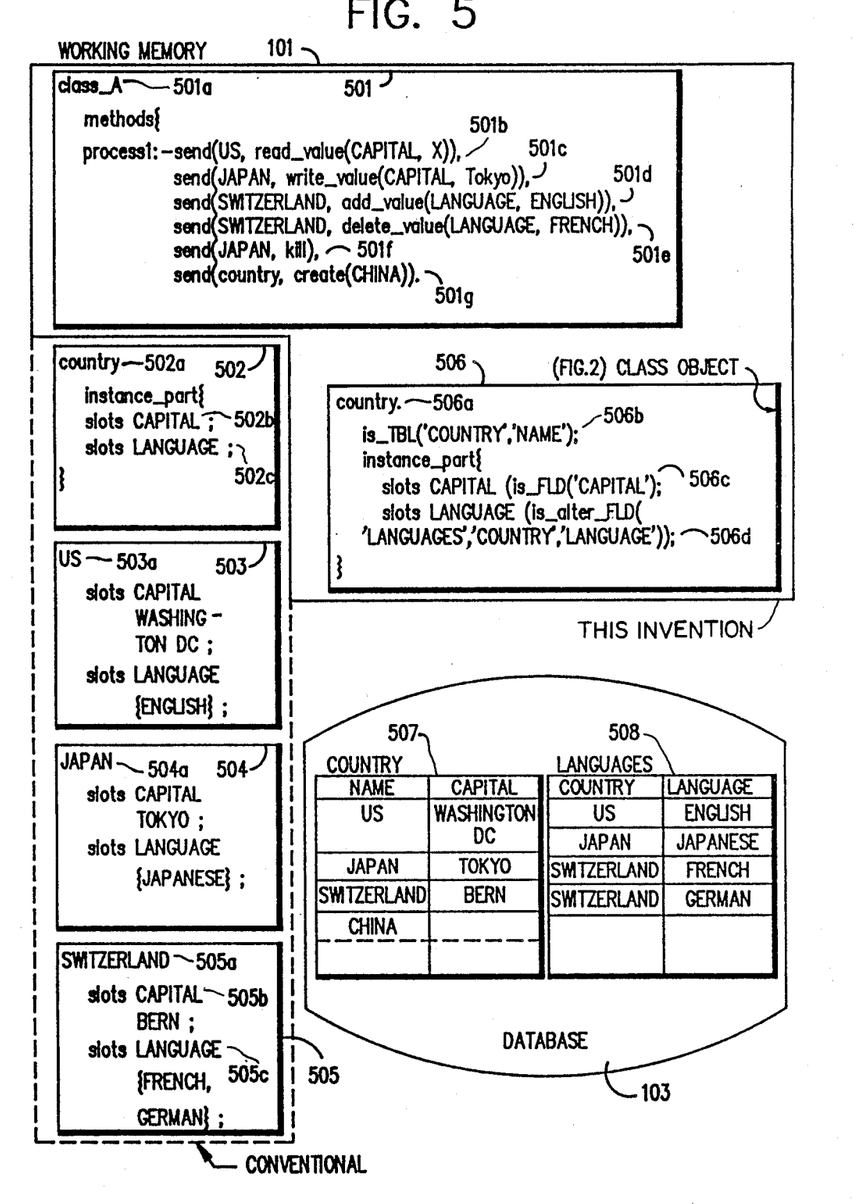
FIG. 5 shows the structure of the correspondence relation table in relation to the data structures and description tables of the present invention.

The working memory 101 contains many objects, as shown by 501–506 in FIG. 5. Each object represents a piece of knowledge.

The object has its name. Object names are unique in the working memory 101, which are indicated by 501*1*–506*a*.

Each object has a slot, which is a container for containing a value representing the state of the object. The slot is like a variable in terms of programming language, as indicated by 502*b* and 502*c*, etc. in FIG. 5. As indicated by 505*b* and 505*c* in FIG. 5, a slot may have one or more values. Slot 505*b* has one value and slot 505*c* has two values.

The object includes a method which is the same as an instruction in an usual programming language. The method makes functions such as reading of the value of a slot, writing of a value into a slot, creating a new object, and deleting of an object. Those methods are exemplified by 501*b*–501*g* in FIG. 5.

Now, the difference in processing between application and no application of a data base is explained.

A processing where a data base is not used is explained using the objects 501–505.

Assume the method "process 1" for an object 501 is executed. When the process 1 is to be executed the methods 501*b*–501*g* are made active.

Methods 501b–501g will be explained below.

The method 501b is one which serves to read a value of a slot "CAPITAL" in an object 503, and substitute a value it for a variable "X" of the method 501b.

The method 501c is one which functions to write a value "TOKYO" in a slot "CAPITAL" in the object 504. By execution of this method, the value of the slot in the object 504 is rewritten as "TOKYO".

The method 501d is one which serves to add a value "ENGLISH" in a slot "LANGUAGE" on the object 505. Accordingly, by execution of this method, the value of the slot of the object "LANGUAGE" is rewritten as "(FRENCH, GERMAN, ENGLISH)".

The method 501f is one which serves to delete an object 504. By execution of this method, the object 504 is deleted from the working memory 101 to disappear therefrom.

The method 501g is one which serves to generate an instance inference object for a class object 503. By execution of this method, an object having a name of "CHINA" is crated in a working memory 101, but at that time, this object 502 has not yet had a slot value.

The foregoing operations are performed through an inference engine 102 by reading out methods from knowledge in the working memory 101 and executing the methods. The inference engine 102 is a type of an interpreter in programming language systems.

An example of processing using a data base is explained with reference to objects 501 and 502 and a data base 103.

In case of using a data base, an instance frame is present in the data base 103, but not in the working memory 101.

The object 506 represents a class object having a correspondence relation table therein.

The correspondence relation table does not represent a table in the data base, but represents a description indicating correspondence relations between class objects (e.g., 506) and the tables (e.g., 507 and 508) in the data base.

The function of the correspondence relation table will be explained with reference to a class object 506 by way of example.

The object 506 has a name of "country". The object has a correspondence with a table 507 in the data base 103. This is indicated by a portion "is-TBL ('COUNTRY', " in a description 506b, from which it is known that an instance frame of the class object 506 exists in the table 507.

Then, the class object must indicate where the name of the instance object and the value of the slot are in the table 507. Instance object name and slot value are preset in columns of the table 507.

The name of instance object is present in a column indicated by a description 506b of "NAME');", that is, in a column 'NAME' of table 507. The slot value of a slot name "CAPITAL" is present in a column indicated by a description 506c of "is-FLD('CAPITAL'), that is, in a column 'CAPITAL' in the table 507.

As previously stated, the object name must be unique, and so, the same name must not appear of exits in the column "NAME" of the table 507.

Next, the class object must in what location of the data base the slot value taking plural values as in slot 505c of the object 505 is. In order to provide plural values in one slot, another table than the table 507 must be used. So, the class object designates the name of such another table, the name of columns in which instance object names are registered, and the name of columns in which plural slot values are entered.

The another table name is indicated by a description of "is-alter-FLD ('LANGUAGES', ", namely, by a table 508. The column in which instance object names are registered exists in "COUNTRY" subsequent to 'LANGUAGES', that is, in a column 'COUNTRY' of the table 508. The column in which plural slot values are registered exists in 'LANGUAGE' subsequent to 'COUNTRY', that is, in the column 'LANGUAGE' in the table 508.

Instances of the class object having a correspondence relation table are stored at designated locations of the data base.

Now, an explanation is made of a method 501b by means of an example.

With execution of the method 501b, a class to which an object "US" belongs is determined. If the determined class has a correspondence relation table, it is examined in accordance with the table which column of the data base a slot of "CAPITAL" corresponds to. From a description 506c it is determined that that slot corresponds to a column "CAPITAL" in the table 507 of the data base 103. In the table 507, a tuple having "US" is searched and, as a result, "WASHINGTON DC" which is a value of the column "CAPITAL" is found and is substituted for a variable "X" of the method 501b.

Thus, the table name, the column, and tuple search conditions for the data base are determined, using a correspondence relation table based on an object name and slot name which are designated by a method, whereas such equivalents are conventionally obtained by performing a large number of object operations in a working memory to disadvantage.

The inference engine 102 reads a method or instruction from knowledge data of the working memory 101, and executes the method or instruction. The data base translation mechanism 104 serves to execute the method to the data base in place of the inference engine 102. Since it is the inference engine 102 which serves to read a method from the knowledge data of the working memory 101, the inference engine 102 transfers to the data base translation mechanism 104 information on what data the inference engine 102 has read. The data base translation mechanism 104 accesses to the data base in accordance with a program indicated by a flow chart in FIG. 4.

In FIG. 1, the working memory 101 contains objects which represent the knowledge. Each object has slots (variables) which represent the name and content of the object and a previously prepared method or program which represents an operation of the object. The inference engine 102 executes the program of the object to draw an inference. When the inference engine 102 executes the program of the object corresponding to the data of the data base, it transfers the program to be executed to the data base translation mechanism 104, which processes data from the data base 103 in accordance with the program transferred from the inference engine 102.

Figure 2:
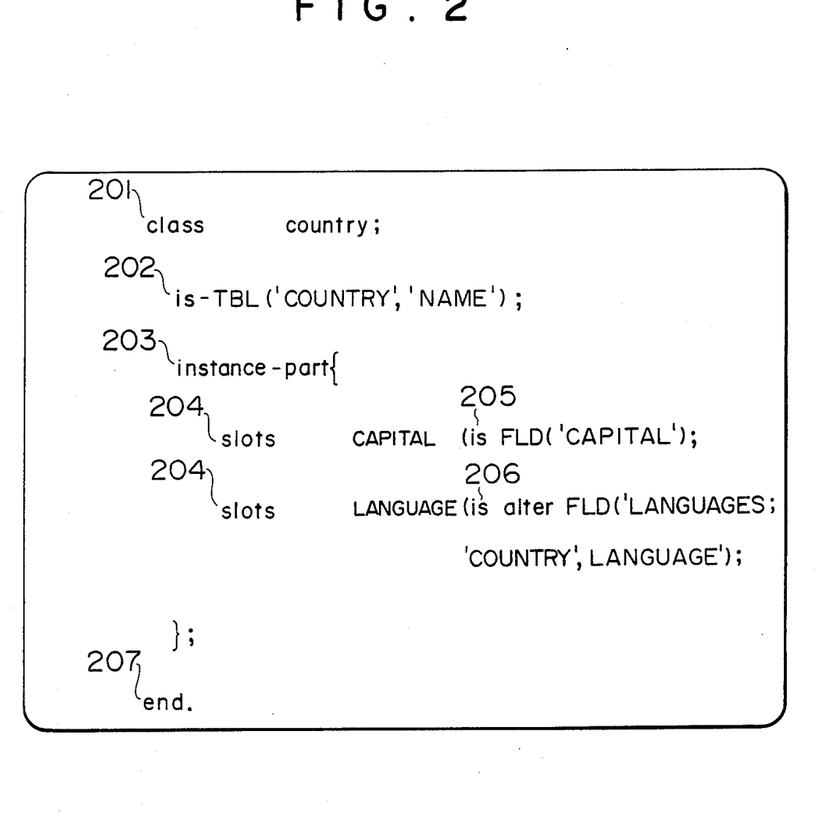
FIG. 2 shows a table of description which relates knowledge to data of a data base.

FIG. 2 shows an example of knowledge designated "country" as an expression of knowledge. This knowledge having a correspondence relation table between the knowledge and the data base. The knowledge includes a class object which represents a sample and an instance object which represents specific knowledge. The instance object is generated by executing the generation method (program) for the instance object to the class object. The term "is-TBL" 202 defines a column at which the table of the data base corresponding to the class and the instance name (name of specific example) are stored. In FIG. 2, the class "COUNTRY" corresponds to the table "COUNTRY", and the instance name is stored in the column "NAME" of the table. The term "instance-part" 203 is a character string which represents an instance definition part for defining a slot of the instance object and a method. Parentheses { } following the instance-part 203 is the instance definition part. The slot and method described in this part are used as the slot and method of the instance when the instance object for the class is generated. The term "slots" 204 is a character string which represents a definition of the slot representing the content of the object. Namely, it represents that the instance generated from the class COUNTRY has slots of CAPITAL and LANGUAGE. The term "is-FLD" 205 is one attribute of the slot and it is a character string for relating the CAPITAL slot 204 and the column in the table COUNTRY designated by "is-TBL" 202. The slot having that attribute utilizes the column value of one tuple designated by the instance name as the slot value. The slot CAPITAL of the instance object represents that it corresponds to the column (place) CAPITAL of the table COUNTRY. "is-alter-FLD" 206 is one attribute of the slot and it is a character string which defines other table and column than the table designated by "is-TBL" 202 so that a plurality of column values may be used as a slot value of one slot. In FIG. 2, LANGUAGES is the name of other table than the table COUNTRY designated by "is-TBL" 202 and it stores a slot value of the slot LANGUAGE. COUNTRY is the name of the column of the table LANGUAGES and it is the name of column in which the instance name is stored. LANGUAGE is the name of the column in which the slot value of the slot LANGUAGE is stored. The term "end" 207 is a character string which represents the end of class definition. In FIG. 2, it represents the end of the definition of the class COUNTRY.

In FIG. 2, the instance object in the class COUNTRY has slots CAPITAL and LANGUAGE. The slot CAPITAL having the description "is-FLD" 205 has at most one valve, and the slot LANGUAGE having the description "is-alter-FLD" has a plurality of values. The data of the data base which are handled as the instance object belonging to the class COUNTRY are in the tables COUNTRY and LANGUAGES. The data in the column NAME of the table COUNTRY is handled as the instance name, the data in the column CAPITAL of the table COUNTRY is handled as the value of the slot CAPITAL, and the data in the column LANGUAGE of the table LANGUAGES is handled as the value of the slot LANGUAGE.

Figure 3:
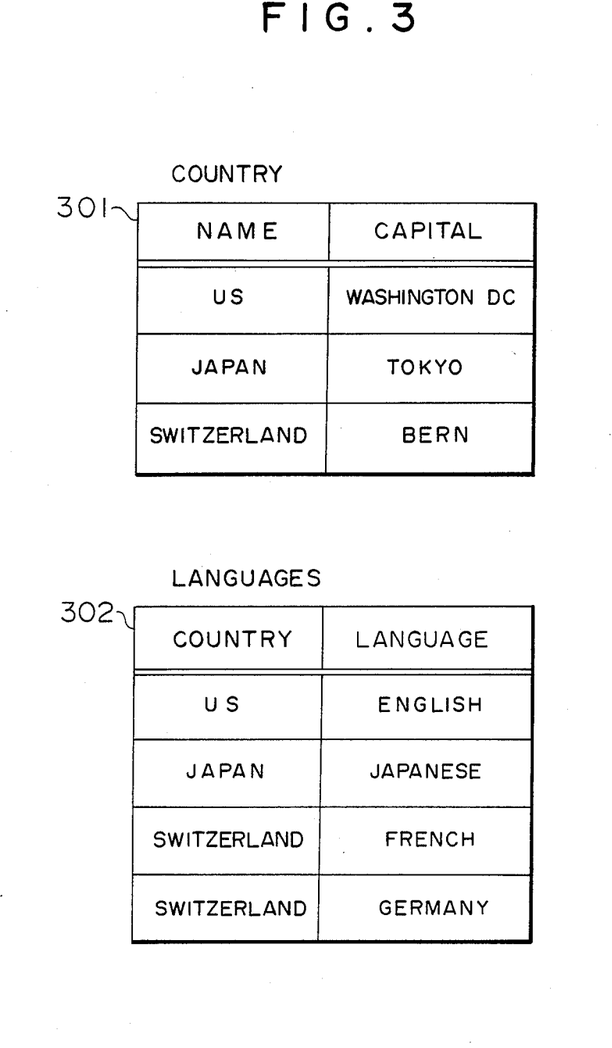
FIG. 3 shows an example of data structure of the data base used in the description of FIG. 2.

FIG. 3 shows a data structure in the data base which is utilized in the class definition of FIG. 2. In the present embodiment, the data structure is represented in the form of table because a relational data base is used.

A table 301 is designated by the name COUNTRY. It includes columns NAME and CAPITAL. A table 302 is designated by the name LANGUAGES. It includes columns COUNTRY and LANGUAGE. Each row of the table is called a tuple. The data base is provided with retrieval, updating, addition and deletion command for the tuple.

A plurality of equal values must be present in the column NAME of the table 301 which stores the name of the instance object defined by "is-TBL" 202 of FIG. 2, because one tuple is selected by using the name of the instance object. However, the column COUNTRY which stores the name of the instance object of the table LANGUAGES 302 defined by "is-alter-FLD" 206 is a column which stores the name of the instance object as is the column NAME of the table COUNTRY 301, but the values in the column need not be unique to each other. The table LANGUAGES 302 permits the use of a plurality of column values as slot values, and the tuples having the same value in the columns COUNTRY are handled as the same instance object value.

Figure 4:
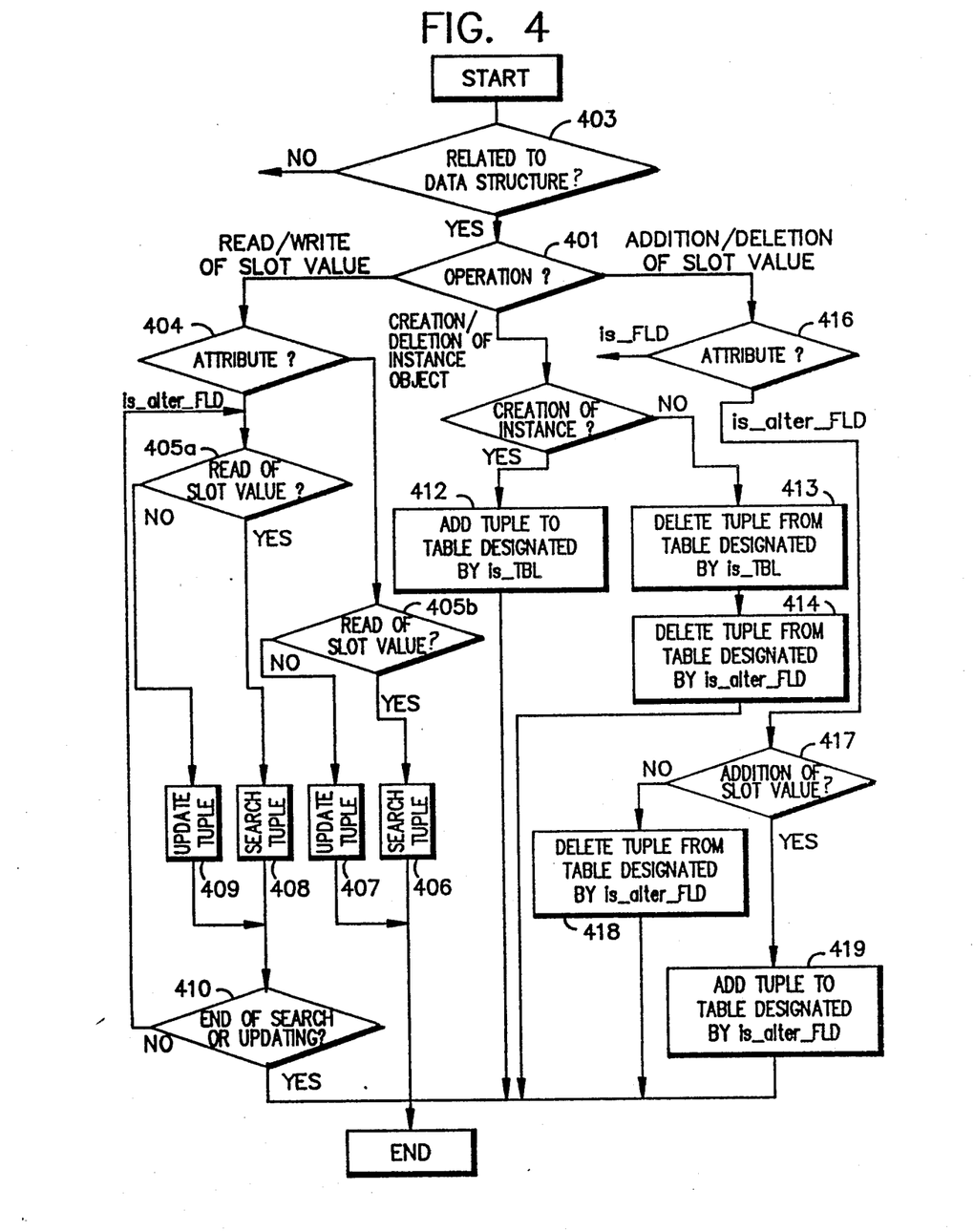
FIG. 4 shows a flow chart of an operation of the embodiment.

FIG. 4 illustrates an operation of the present embodiment.

The processing of the expert system for the slot includes reading and writing of a slot value, addition and deletion of the slot value, and creation and deletion of the slot due to creation and deletion of the instance object. This is attained b the inference engine 102 which executes the method or program present in the working memory 101.

When the inference engine 102 executes the method for the knowledge having the correspondence relation table, it transfers the method to the data base translation mechanism 104, which converts it to a command of the data base depending on the type of method to automatically refer to and update the data base.

FIG. 4 shows a flow chart of the process of the data base translation mechanism 104.

When the slot value of the instance object is to be read, the instance object name and the slot name are designated to the method for reading the slot value present in the working memory 101. The data base translation mechanism 104 determines whether the instance object belongs to the class having the correspondence relation table, and if it is, refers to the attribute of the slot designated by the method.

When the attribute in the slot is "is-FLD" 205, a tuple having the instance object name designated as the method as a value in the column which stores the instance object name defined by "is-TBL" 202 is searched from the table defined by "is-TBL" 202, the value of the column defined by the attribute "is-FLD" 205 is read, and the result is transferred to the inference engine 102 (Path 403, 401, 402, 404, 405, 406 in the flow chart of FIG. 4).

When the attribute in the slot is "is-alter-FLD" 206, a tuple having the instance object name designated as the method as a value in the column which stores the instance object name defined by the attribute "is-alter-FLD" 206 is searched from the table defined by the attribute "is-alter-FLD" 206, the value of the column defined by the attribute "is-alter-FLD" 206 is read, and the result is transferred to the inference engine 102. Searching for the tuple and transfer of the result to the inference engine 102 are repeated until the tuple having the instance object name as a value in the column which stores the instance object name defined by the attribute "is-alter FLD" 206 is exhausted. (403, 401, 402, 404, 405, 408, 410 in the flow chart of FIG. 4).

When a value is to be written into the slot having the attribute "is FLD" 205 of the instance object, the instance object name, the slot name and the value to be written into the slot are designated for the method for writing the slot value present in the working memory 101. The data base translation mechanism 104 determines whether the instance object belongs to the class having the correspondence relation table, and if it is, refers to the attribute of the slot designated by the method. If the attribute present in the slot is "is-FLD" 205, the value of the column defined by the attribute "is-FLD" 205 of the tuple having the instance object name designated as the method as a value in the column which stores the instance object name defined by the attribute "is-TBL" 202 of the table defined by the attribute "is-TBL" 202 is updated by the value to be written into the slot designated by the method. (Path 403, 401, 402, 404, 405, 407 in the flow chart of FIG. 4).

When the value of the slot having the attribute "is-alter-FLD" 206 of the instance object is to be updated, the instance object name, the slot name, the value to be updated and the updating value are designated for the method for updating the slot value present in the working memory 101. The data base translation mechanism 104 determines whether the instance object belongs to the class having the correspondence relation table, and if it does, refers to the attribute of the slot designated by the method.

If the attribute present in the slot is "is-alter FLD" attribute, the value of the column defined by the attribute "is-alter FLD" 206 of the tuple which has the instance object name designated by the method as a value in the column which stores the instance object name defined by the attribute "is-alter-FLD" 206 of the table defined by the attribute "is-alter-FLD" 206 and which has the slot value defined by the attribute "is-alter FLD" 206, by the updating value designated by the method. (Path 403, 401, 402, 405, 409, 410 in the flow chart of FIG. 4).

When a value is to be added to the slot of the instance object, the instance object, the slot name and the value to be added are designated for the method for adding the slot value present in the working memory 101. The data base translation mechanism 104 determines whether the instance object belongs t the class having the correspondence relation table, and if it does, refers the attribute of the slot designated by the method.

If the attribute present in the slot is "is-alter FLD" 206, a tuple having the instance object name designated for the method in the column which stores the instance object name defined by the attribute "is-alter-FLD" 206 of the table defined by the attribute "is-alter FLD" 206 and having the value to be added designated by the method in the column having the slot value defined by the attribute "is-alter FLD" 206 is added to the table defined by the attribute "is-alter FLD" 206. (Path 403, 401, 415, 416, 417, 419 in the flow chart of FIG. 4).

When one slot value of the instance object is to be deleted, the instance object name, the slot name and the slot value are designated for the method for deleting the slot value present in the working memory 101. The data base translation mechanism 104 determines whether the instance object belongs to the class having the correspondence relation table, and if it does, refers to the attribute of the slot designated by the method.

If the attribute present in the slot is "is-alter-FLD" 206, a tuple having the instance object name designated for the method in the column which stores the instance object name defined by the attribute "is-alter-FLD" 206 and having the value to be added designated by the method in the column having the slot value defined by the attribute "is-alter FLD" 206, is deleted from the table defined by the attribute "is-alter-FLD" 206. (Path 401, 415, 416, 417, 418 in the flow chart of FIG. 4).

When the instance object is to be generated, the class object name and the instance object name are designated for the method for generating the instance object present in the working memory 101. The data base translation mechanism 104 determines whether the instance object belongs to the class having the correspondence relation table, and if it does, refers to the attribute of the slot designated by the method.

The values of the columns other than the column which stores the instance object name are null (Path 403, 401, 411, 412 in FIG. 4). When the instance object is to be deleted, the instance object name is designated by the method for deleting the instance object present in the working memory 101. The data base translation mechanism 104 determines whether the data base translation mechanism 104 belongs to the class having the correspondence relation table, and if it does, refers to the attribute of the slot designated by the method.

A tuple having the instance object name designated by the method in the column which stores the instance object name defined by "is-TBL" 202 is deleted from the table defined by "is-TBL" 202. A tuple having the instance object name designated by the method in the column which stores the instance object name defined by "is-alter-FLD" 206 is deleted from the table defined by "is-alter-FLD" 206. (Path 403, 401, 411, 413, 414 in the flow chart of FIG. 4).

In other cases, the data of the data base is not processed.

The operation shown in FIG. 4 is explained in connection with FIGS. 2 and 3.

In FIGS. 2 and 3, three instance objects, US Japan and Switzerland which belong to the class COUNTRY are present. Each instance is related to the tables COUNTRY and LANGUAGES in the data base of FIG. 3, each instance name corresponds to the column NAME of the table COUNTRY and the column COUNTRY of the table LANGUAGES, the slot CAPITAL corresponds to the column CAPITAL of the table COUNTRY, and the slot LANGUAGE corresponds to the column LANGUAGE of the table LANGUAGES.

When the methods are executed for the instance objects belonging to the class COUNTRY of FIG. 2, the following result is obtained. For example, when the value of the slot CAPITAL of the instance object JAPAN is to be read, the value in the column CAPITAL of the tuple having the value JAPAN in the column NAME of the table COUNTRY is read from the correspondence relation table. The value "TOKYO" is read. When the value LANGUAGE of the instance object SWITZERLAND is to be read, the value in the column LANGUAGE of the tuple having the value SWITZERLAND in the column COUNTRY of the table LANGUAGES is read from the correspondence relation table. Two values FRENCH and GERMANY are read.

When a value "Tokyo" is to be written into the slot CAPITAL of the instance object JAPAN, the column CAPITAL of the tuple having the value JAPAN in the column NAME of the table COUNTRY is updated to TOKYO by the correspondence relation table. Similarly, when the value FRENCH in the slot LANGUAGE of the instance object SWITZERLAND is to be changed to a value ITALIAN, the value in the column LANGUAGE of the tuple having the value SWITZERLAND in the column COUNTRY of the table LANGUAGES and having the value FRENCH in the column LANGUAGE is updated to the value ITALIAN by the correspondence relation table.

When the value ENGLISH is to be added to the slot LANGUAGE of the instance object SWITZERLAND, a tuple having the value SWITZERLAND in the column COUNTRY and having the value ENGLISH in the column LANGUAGE is added to the table LANGUAGES by the correspondence relation table. When the value FRENCH in the slot LANGUAGE of the instance object SWITZERLAND is to be deleted, the tuple having the value SWITZERLAND in the column COUNTRY of the table LANGUAGES and having the value FRENCH in the column LANGUAGE is deleted by the correspondence relation table. When an instance object CHINA is to be added to the class COUNTRY, a tuple having the value CHINA in the column NAME and the value NULL in the column CAPITAL is added to the table COUNTRY by the correspondence relation table. If the value CHINA already exists in the column NAME, the tuple is not added to the table. When the instance object JAPAN is to be deleted, the tuple having the value JAPAN in the column NAME is deleted from the table COUNTRY, and the tuple having the value JAPAN in the column COUNTRY is deleted from the table LANGUAGES by the correspondence relation table.

In accordance with the present embodiment, the area in the working memory which stores the slot value is not necessary.

In the present embodiment, a plurality of tables rather than one table which correspond to one class, for example, COUNTRY are provided so that more flexible correspondence relation can be defined than a case where one table defines one class.

As described hereinabove, in accordance with the knowledge utilization system of the data base of the present invention, the data structure of the data base can be directly used as the knowledge for the inference in the expert system and the knowledge obtained by the inference can be directly stored into the data base by merely describing the definition of the correspondence relation between the knowledge and the data base. Accordingly, compared to the case where the data base is previously translated to the overall knowledge base, no intermediate area for the knowledge base is required, the amount of description of the knowledge is significantly reduced, the consumption of the area for the description is reduced and the structuring work of the expert system is simplified. Accordingly, the description of the knowledge is simplified, and a high quality expert system can be structured in a short time.

What is claimed is:

1. A method for translating data in a data base to knowledge in an expert system, the expert system drawing inferences based on the knowledge, the method comprising the steps of:

preparing a correspondence relation table defining a correspondence relation between the knowledge and the data base;

reading data from the data base each time knowledge related to the data base is referenced by the correspondence relation table during an inference by the expert system and translating the data to knowledge; and translating knowledge related to the data base prepared by the correspondence relation table during the inference into data of the data base using the correspondence relation table, and storing the translated knowledge in the data base, whereby data of the data base can be accessed from said expert system in a knowledge form.

2. The method according to claim 1, wherein said preparing step further includes preparing the correspondence relation table to define a correspondence between the knowledge utilized in the expert system and the data of the data base, to determine unique data of the data base for particular knowledge in the expert system.

3. The method according to claim 1, further comprising the step of automatically effecting a retrieval, an update, an addition or deletion of data of the data base determined by the correspondence relation table each time a retrieval, an update, an addition or deletion of particular knowledge is effected in an inference process, whereby only data necessary for an inference in an execution of an instruction is fetched and translated into corresponding knowledge.

4. An apparatus for translating data in a data base to knowledge in an expert system having a working memory for storing the knowledge and an inference engine for drawing inferences based on the knowledge, the apparatus comprising:

a correspondence relation table stored in said working memory, for defining a correspondence relation between the knowledge and the data base;

means for reading first data from the data base each time knowledge related to the data base is reference by the correspondence relation table during an inference by the expert system, and translating the first data into first knowledge; and means for translating the first knowledge related to the data base prepared by the correspondence relation table during the inference into data of the data base using the correspondence relation table, and storing the translated first knowledge in the data base, whereby the data of the data base can be accessed from said expert system in a knowledge form.

5. An apparatus for translation of a data base to knowledge in an expert system which draws inferences based on knowledge, the apparatus comprising:

a correspondence relation table for defining a correspondence relationship between the knowledge and the data base, and for effecting translation therebetween;

data base-to-knowledge translation means for reading data necessary for an inference directly from the data base by referring to said correspondence relation table, and for translating it into knowledge form; and knowledge-to-data base translation means for translating knowledge prepared by the inference to translated data of data base form by referencing said correspondence relation table, and for storing the translated data thus produced.

* * * * *